(12) United States Patent
Downey (10) Patent No.: US 9,033,366 B1
(45) Date of Patent: May 19, 2015

(54) SYSTEM FOR COOLING A STEERING WHEEL AND A METHOD OF MAKING

(71) Applicant: Nissan North America, Inc., Franklin, TN (US)

(72) Inventor: Brian Downey, Westland, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 14/322,095

(22) Filed: Jul. 2, 2014

(51) Int. Cl.
*B60R 21/16* (2006.01)
*B60R 21/2342* (2011.01)

(52) U.S. Cl.
CPC .................................. *B60R 21/2342* (2013.01)

(58) Field of Classification Search
USPC ........... 29/894.1; 74/552; 237/12.3; 280/731; 454/141, 142, 143
See application file for complete search history.

(56) References Cited

U.S. PATENT DOCUMENTS

| | | | |
|---|---|---|---|
| 1,615,635 A * | 1/1927 | Kuno ............................. | 74/552 |
| 4,640,340 A | 2/1987 | Noda et al. | |
| 5,850,741 A | 12/1998 | Feher | |
| 6,298,750 B1 | 10/2001 | Kerner et al. | |
| 6,481,312 B1 * | 11/2002 | Wissel ............................ | 74/552 |
| 6,509,552 B1 * | 1/2003 | Roske et al. .................. | 219/497 |
| 6,533,184 B1 | 3/2003 | Kim | |
| 6,862,807 B2 * | 3/2005 | Wissel ......................... | 29/894.1 |
| D559,158 S * | 1/2008 | Garcia et al. ................. | D12/176 |
| 7,908,941 B2 * | 3/2011 | Menaldo et al. ............... | 74/552 |
| 2004/0168540 A1* | 9/2004 | Weiss .............................. | 74/552 |
| 2009/0007721 A1 | 1/2009 | Cortina et al. | |
| 2009/0114368 A1* | 5/2009 | Niwa et al. ..................... | 165/42 |
| 2011/0084055 A1 | 4/2011 | Park et al. | |
| 2013/0180354 A1 | 7/2013 | Maranville et al. | |
| 2014/0090513 A1* | 4/2014 | Zhang et al. ................... | 74/552 |

FOREIGN PATENT DOCUMENTS

| | | |
|---|---|---|
| JP | S61-018562 A | 1/1986 |
| JP | H02-293255 A | 12/1990 |
| JP | H04-066335 A | 3/1992 |

* cited by examiner

*Primary Examiner* — Toan To
(74) *Attorney, Agent, or Firm* — Global IP Counselors, LLP (57) ABSTRACT

A system includes a fan and a duct system. The fan is configured to be attached to the steering wheel. The duct system has a first portion and a second portion, and is configured to be coupled to an exterior surface of an armature of the steering wheel and enable air from the fan to be communicated from the fan to a surface of the steering wheel. The first portion includes a section extending along the armature of the steering wheel, and the second portion includes a plurality of nozzles extending radially from an outer surface of the first portion toward an outer surface of the steering wheel.

20 Claims, 10 Drawing Sheets

SYSTEM FOR COOLING A STEERING WHEEL AND A METHOD OF MAKING

BACKGROUND

1. Field of the Invention

The present invention generally relates to a cooling system for a steering wheel. More specifically, the present invention relates to a cooling system for a steering wheel that includes a duct system that couples to an exterior surface of an armature of the steering wheel and enables air from a fan to be communicated from the fan to a surface of the steering wheel.

2. Background Information

As is understood, vehicle touch surfaces can get hot after being exposed to the sun. For example, existing steering wheels may reach temperatures that are well above the ambient temperature. Because the steering wheel may be exposed to more direct sun than other controls necessary for driving (e.g. ignition switch, shifter, brake, accelerator, seat cushions etc.), the steering wheel may occasionally be uncomfortably warm to touch when a vehicle is first started. Additionally, the thermal comfort of vehicle occupants is an important aspect of the driving experience. Thus, operating a vehicle having a steering wheel in a suitable temperature range may be an important feature to an operator of a vehicle. In view of the above, a need exists for an improved system to cool vehicle steering wheels.

SUMMARY

It has been discovered that it is difficult to produce a cooling system for a steering wheel that is cost efficient, effective and easy to manufacture. Thus, when improving a cooling system for a steering wheel, a duct system was developed that coupled to an armature, enabling the system to be effective, cost efficient and easy to manufacture.

In view of the state of the known technology, one embodiment of the system for cooling a steering wheel includes a fan and a duct system. The fan is configured to be attached to the steering wheel. The duct system has a first portion and a second portion, and is configured to be coupled to an exterior surface of an armature of the steering wheel and enable air from the fan to be communicated from the fan to a surface of the steering wheel. The first portion includes a section extending along the armature of the steering wheel, and the second portion includes a plurality of nozzles extending radially from an outer surface of the first portion toward an outer surface of the steering wheel.

In another embodiment, a steering wheel is provided that is capable of cooling a driver's hands or cooling the surface of the steering wheel. The steering wheel comprises an armature, a fan, a duct system, and a grip portion. The fan is configured to be attached to the steering wheel. The duct system has a first portion and a second portion, and is configured to be coupled to an exterior surface of an armature of the steering wheel and enable air from the fan to be communicated from the fan to a surface of the steering wheel. The first portion includes a section extending along the armature of the steering wheel, and the second portion includes a plurality of nozzles extending radially from an outer surface of the first portion toward an outer surface of the steering wheel. The grip portion is disposed around the duct system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
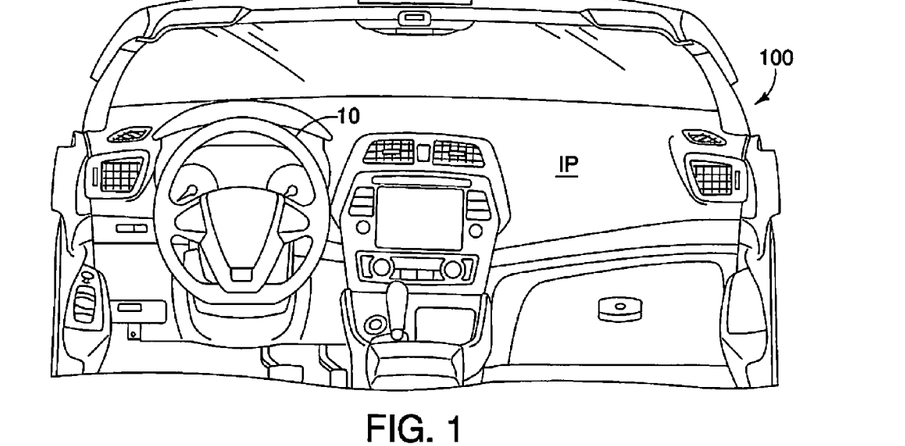
FIG. 1 is a partial view of a passenger compartment of a vehicle.
Figure 2:
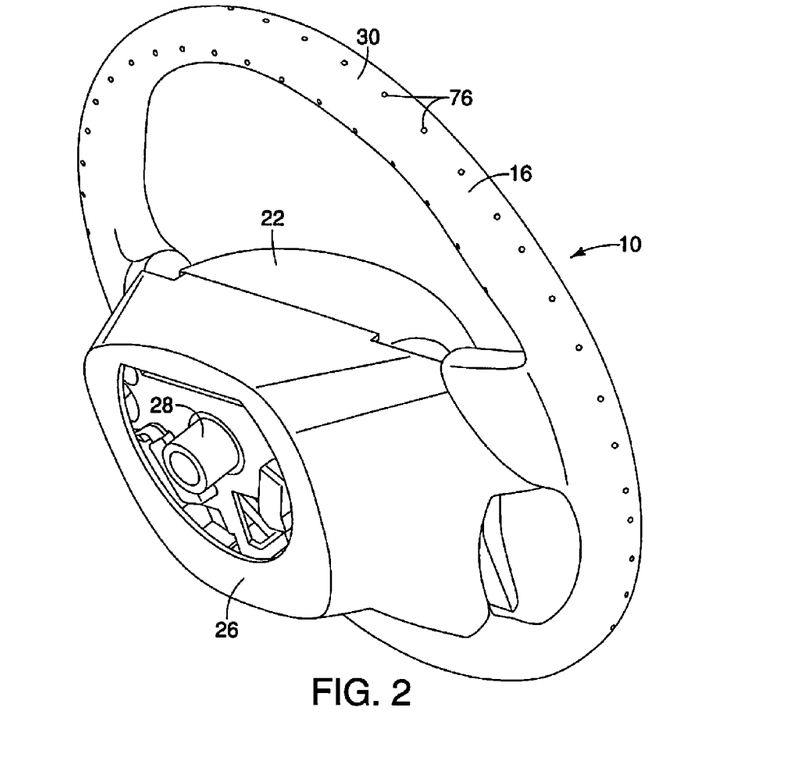
FIG. 2 is a rear perspective view of the steering wheel shown in FIG. 1.
Figure 3:
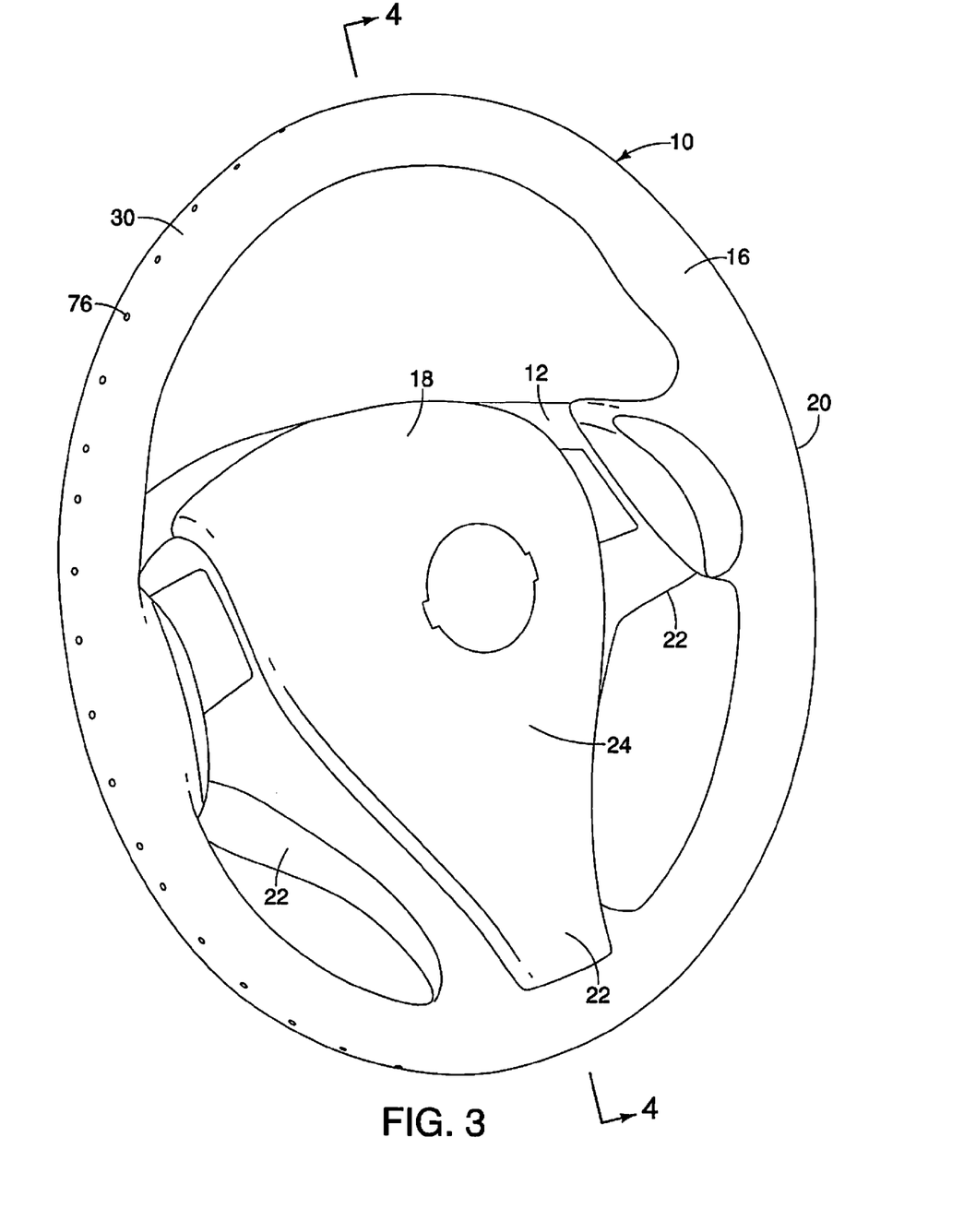
FIG. 3 is a front perspective view of the steering wheel shown in FIG. 1.

Referring initially to FIG. 1, a steering wheel 10 is illustrated in accordance with a first embodiment. The steering wheel 10 is disposed in the passenger compartment of a vehicle 100. The passenger compartment is any suitable compartment and the steering wheel 10 is disposed within the compartment in any suitable manner. The steering wheel 10 is disposed adjacent the instrument panel IP as is known in the art, and operates the vehicle 100 in a conventional manner.

Figure 4:
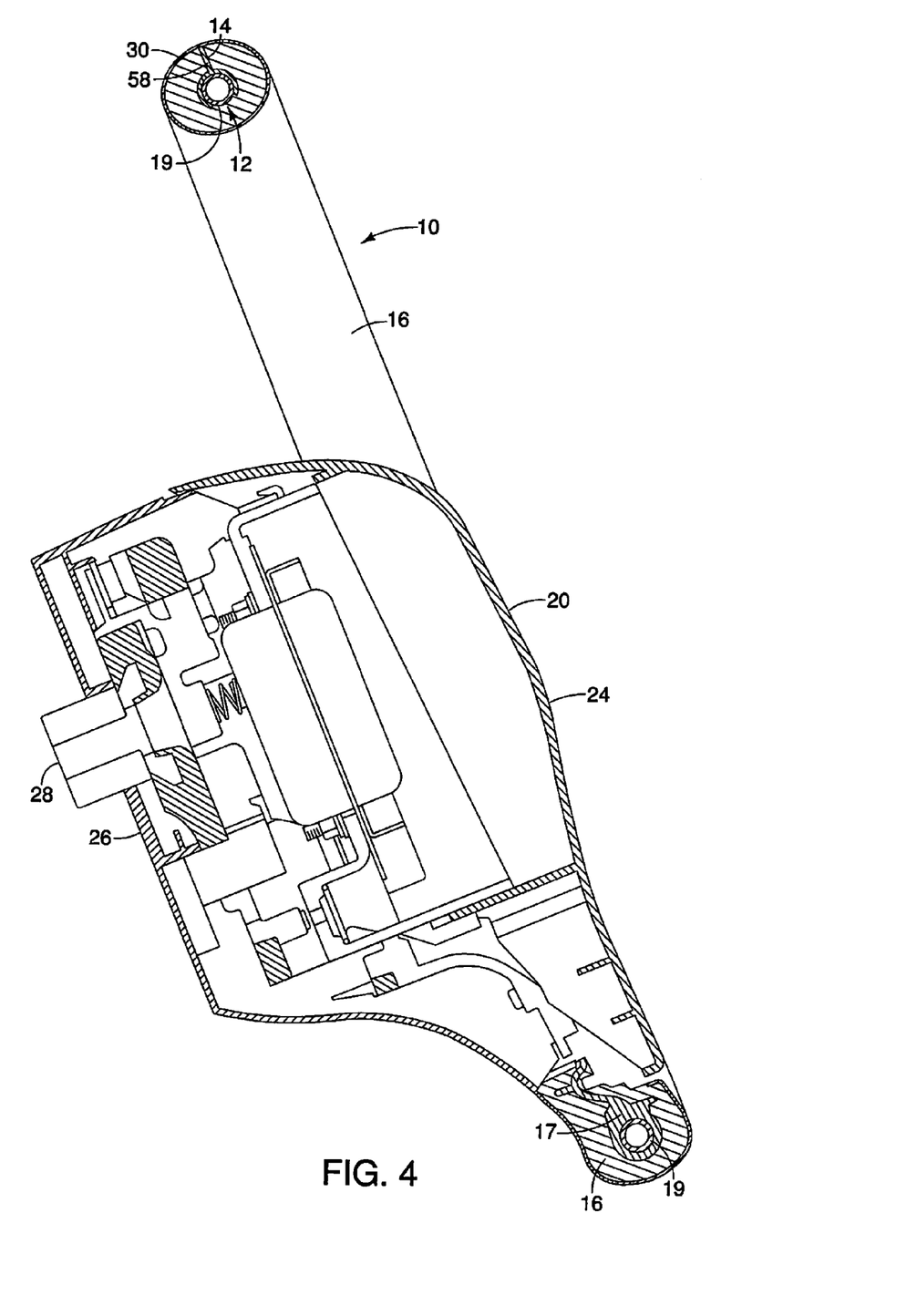
FIG. 4 is a side cross section view of the steering wheel taken along lines 4-4 of FIG. 3.
Figure 5:
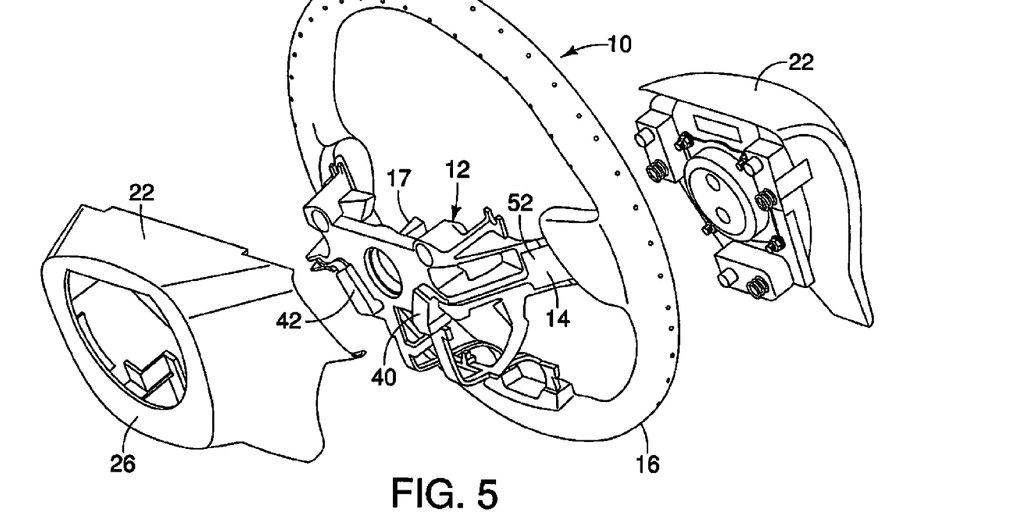
FIG. 5 is an exploded perspective view of the steering wheel shown in FIG. 1.
Figure 6:
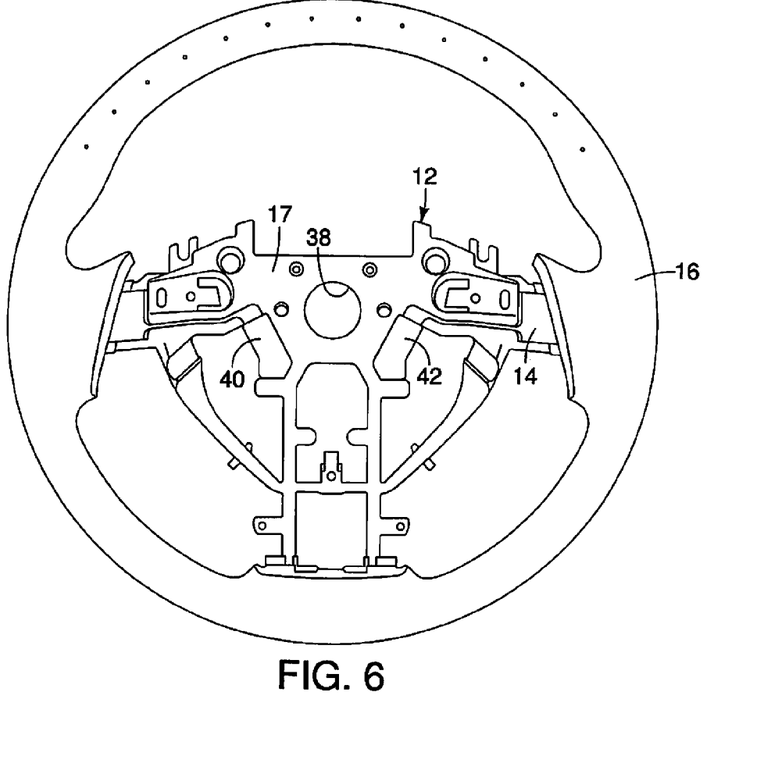
FIG. 6 is a front elevational view of the grip portion, the steering wheel armature and the central portion of the duct system of the steering wheel shown in FIG. 5.

As shown in FIGS. 2-7, the steering wheel 10 includes an armature 12, a duct system 14 and a grip portion 16. The armature 12 further includes a hub portion 17 and a ring portion 19. Moreover, as shown in FIGS. 4 and 5, the steering wheel 10 includes conventional components that enable the steering wheel 10 to operate the vehicle and function as a conventional steering wheel. Moreover, the steering wheel 10 includes a central portion 18, a peripheral portion 20, and arms or spokes 22 that extend from the central portion 18 to the peripheral portion 22. The central portion 18 houses an airbag (not shown) and can have radio, mobile phone, and/or any other suitable switches (not shown) to operate systems within the vehicle 100. The air bag is configured to deploy out of a first side 24 of the central portion 18 so as to expand into the passenger compartment. At the second side 26 of the central portion 18, a coupling member 28 enables the steering wheel 10 to be coupled to a steering column. As is known in the art, an electrical harness or wiring can enter the second side 26 of the central portion 18 so as to enable operation of the switches or other mechanisms disposed on or in the steering wheel 10. The spokes 22 and peripheral portion 20 can be covered with the grip portion 16 or any other suitable material disposed thereon.

Figure 7:
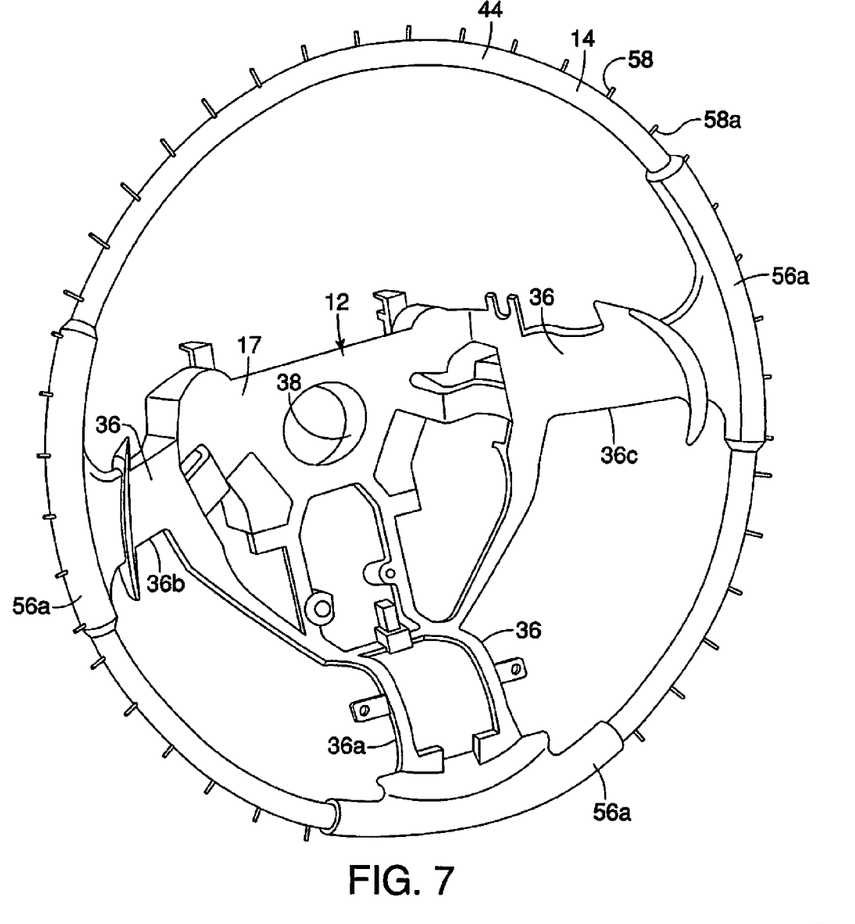
FIG. 7 is a front perspective view of the duct system and the steering wheel armature of FIG. 6 without the grip portion.
Figure 8:
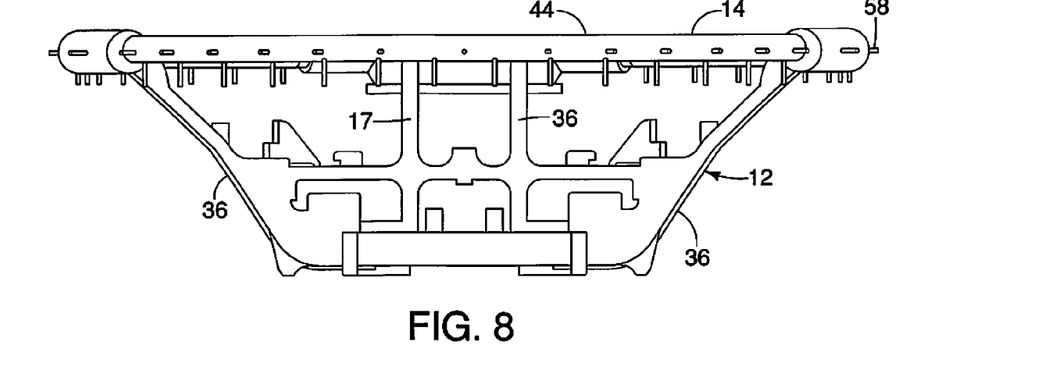
FIG. 8 is a bottom view of the duct system and the steering wheel armature of FIG. 7.
Figure 9:
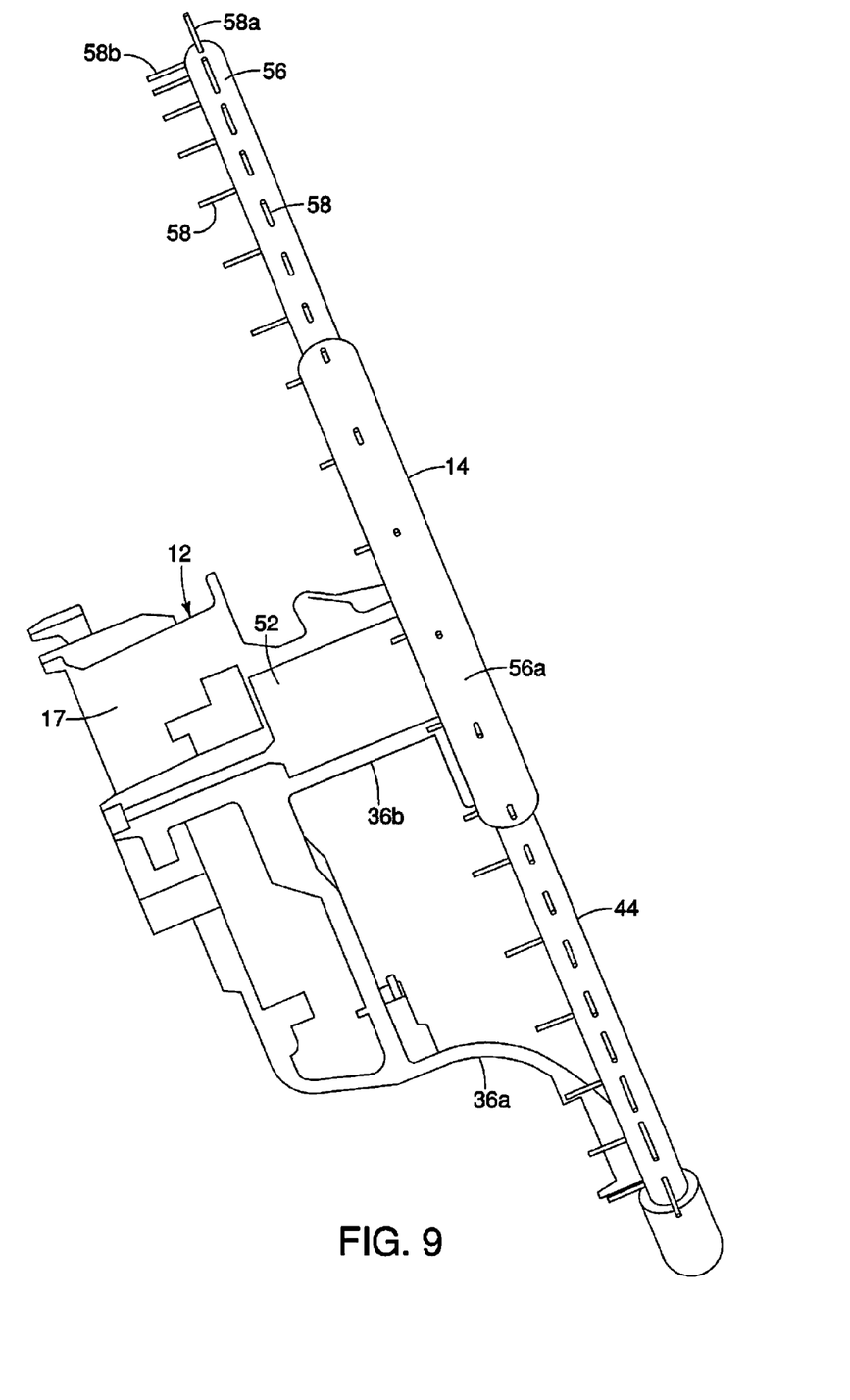
FIG. 9 is a side view of the duct system and the steering wheel armature of FIG. 7.

The duct system 14 forms openings 72 in an exterior surface 30 of the grip portion 16 of the steering wheel 10, thus enabling air to be blown on the exterior surface 30 of the grip portion 16 (i.e., exterior surface of the steering wheel 10), cooling user hands and/or the exterior surface 30 of the grip portion 16 of the steering wheel 10. As shown in FIGS. 7-9, prior to molding of the grip portion 16, the duct system 14 is coupled to the armature 12 so as to closely follow the contours thereof.

Figure 10:
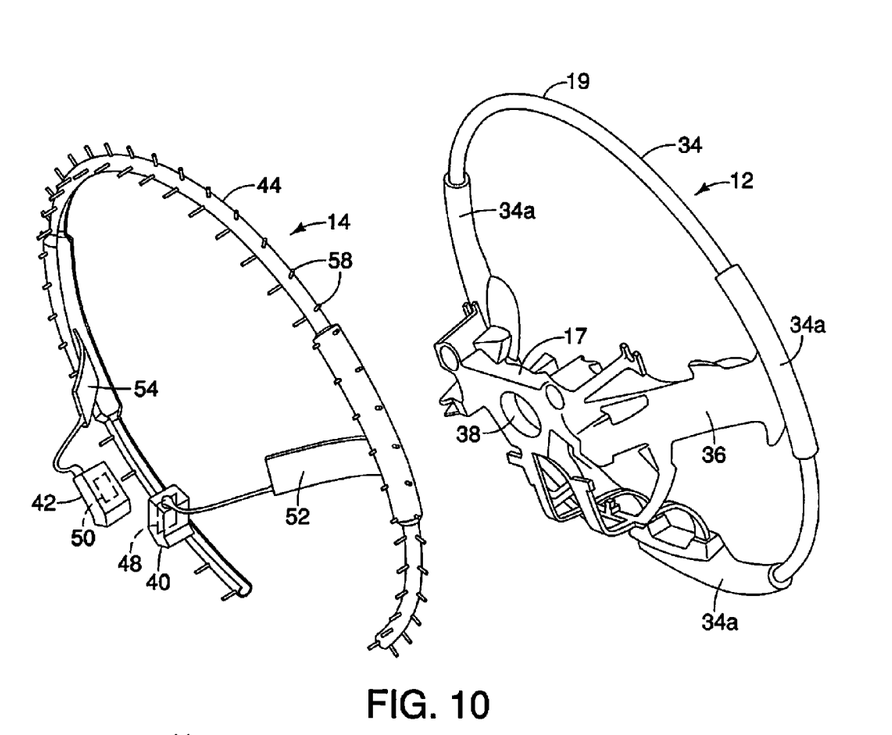
FIG. 10 is an exploded rear perspective view of the duct system and the steering wheel armature of FIG. 7.
Figure 11:
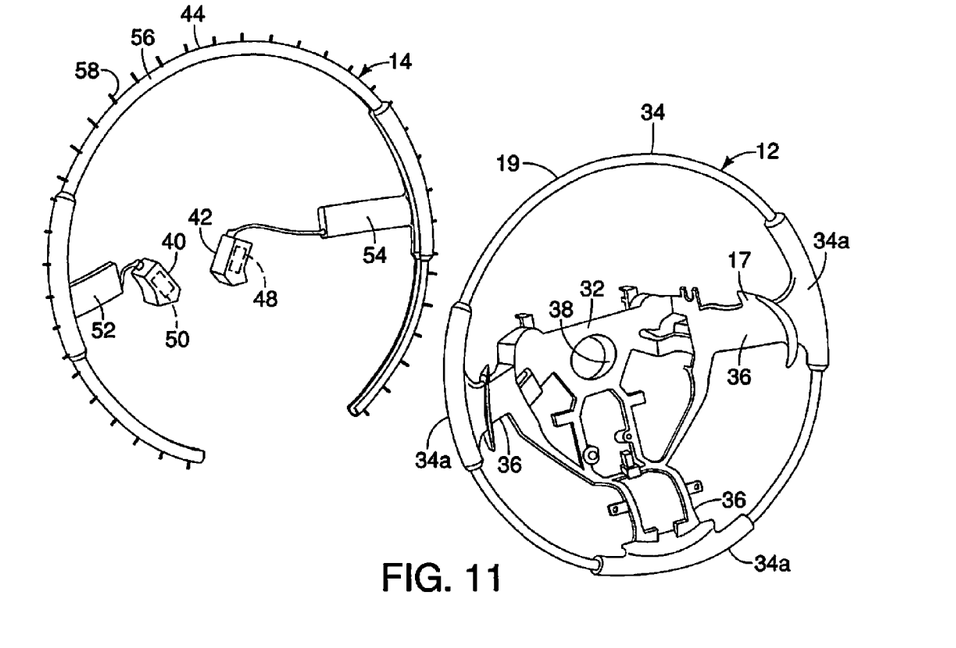
FIG. 11 is an exploded front perspective view of the duct system and the steering wheel armature of FIG. 7.
Figure 12:
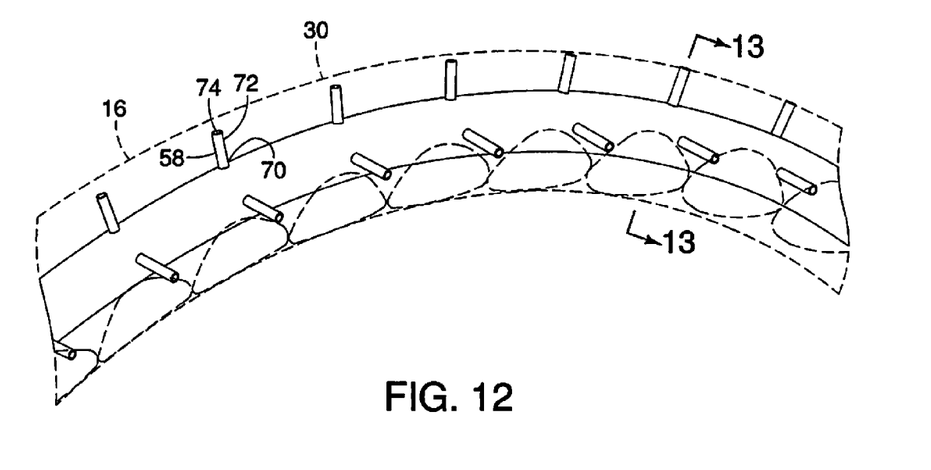
FIG. 12 is an enlarged view of the grip portion shown in FIG. 6, with the duct system and the steering wheel armature shown in phantom.

That is, as shown FIGS. 7-11, the hub portion 17 includes a central portion 32 and arms 36 extending therefrom. The ring portion 19 extends through the hub portion 17 and defines a peripheral portion 34 of the armature 12 that links distal ends of the arms 36. The armature 12 preferably is formed from steel or other suitable material. The center portion 32 can have any suitable configuration that would enable the steering wheel 10 to be connected to a steering column and include an airbag as well as any other suitable mechanisms or devices (e.g., wiring harness for radio and communication switches), as discussed herein. As shown in FIGS. 10 and 11, the central portion 32 includes an opening 38 in the center thereof so as to enable the steering wheel 10 to couple to the steering column, and includes a frame or structure that enables the central portion 18 of the steering wheel 10 to attach thereto.

As shown in FIGS. 7-9, in one embodiment, the hub portion 17 includes three (3) arms 36, a first arm 36*a* extending downwardly, a second arm 36*b* extending to the left and a third arm 36*c* extending to the right. Each of the arms 36*a*, 36*b* and 36*c* extends radially outwardly from the central portion 32 to the peripheral portion 34 and rearwardly toward the passenger compartment, in any suitable manner. Thus, the central portion 32 of the hub portion 17 is arranged to enable the second side 26 of the center portion 18 of the steering wheel 10 to be recessed relative to the grip portion 16, and enable the first side 24 of the steering wheel 10 to be generally coplanar or to protrude slightly in the rear direction from the grip portion 16.

As shown in FIGS. 10 and 11, the ring portion 19 is preferably generally circular and tubular. As is understood, the ring portion 19 is preferably a steel tube that generally forms a circle. The peripheral portion 34 can be hollow, solid or substantially solid or any combination thereof. The peripheral portion 34 can be formed in any suitable manner as is known in the art. The central portion 32 and the arms 36 of the hub portion 17 are preferably steel (or another suitable material) that is molded over the ring portion 19. Thus, the armature 12 includes portions 34*a* having a thicker diameter at an area on the peripheral portion 34 where the arms 36 connect the central portion 32 to the peripheral portion 34. It is noted that although the peripheral portion 34, the central portion 32 and arms 36 are illustrated with a specific configuration, the peripheral portion 34, central portion 32 and arms 36 can be formed to have any configuration desired and be formed from any suitable material.

The duct system 14 is preferably molded plastic and is configured to be coupled to the armature 12. The duct system 14 preferably includes two fan boxes (i.e., a first fan box 40 and a second fan box 42), a peripheral duct section 44 and two connecting ducts or air passages 52 and 54. The two fan boxes 40 and 42 are configured to house micro fans 48 and 50. The micro fans 48 and 50 can be any suitable fan capable of communicating air from the fan boxes 40 and 42 to the grip portion 16. Moreover, there can be one micro fan or a plurality of micro fans. The micro fans 48 and 50 are preferably electrically coupled to the electrical system in the vehicle 100 using a wiring harness. The micro fans 48 and 50 can use existing electrical wiring that extends to the steering wheel 10 (e.g., the wiring harness to operate the audio switches), or have dedicated electrical wiring. Additionally, the micro fans 48 and 50 can be powered in any manner desired, or can be any type of fan desired.

The fan boxes 40 and 42 are attached to and communicate air through the air passages 52 and 54. The air passages 52 and 54 fluidly connect the fan boxes 40 and 42 with the peripheral duct section 44 of the duct system 14. The air passages 52 and 54 are generally hollow so as to enable air to pass therethrough. However, the air passages 52 and 54 can be any configuration that would enable air to pass therethrough and generally follow the contours of the arms 36 of the hub portion 17. The peripheral duct section 44 of the duct system 14 is generally circular, such that it substantially surrounds the peripheral portion 34 of the armature 12. That is, as shown in FIG. 7, the duct system 14 encircles the peripheral portion 34 of the armature 12; however, the duct system 14, in this embodiment, does not completely cover the peripheral portion 34. In this embodiment, the duct system 14 does not cover the bottom area 34*a* where the bottom arm 36*a* of the hub portion 17 couples to the ring portion 19. In other words, the peripheral duct section 44 is arcuate or includes an arcuate section, and the arcuate section extends more than 180 degrees about the periphery of the armature 12. However, the peripheral duct section 44 can extend along the peripheral portion 34 of the armature 12 any distance desired, including completely covering the peripheral portion 34 of the armature 12.

Figure 13:
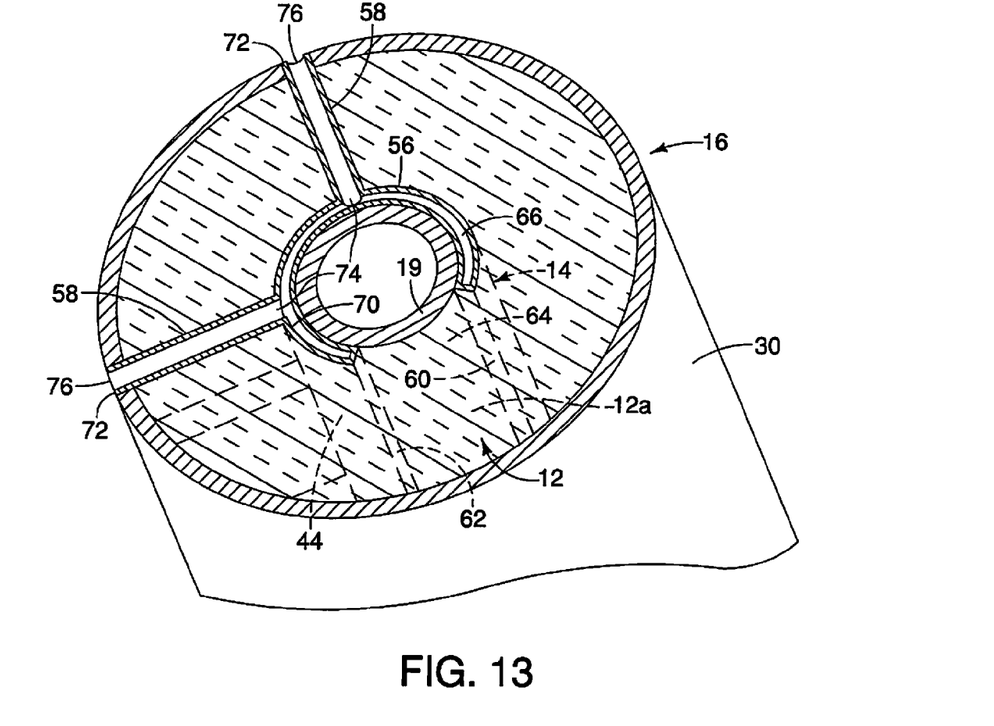
FIG. 13 is cross sectional view of the steering wheel taken along lines 13-13 of FIG. 12.
Figure 14:
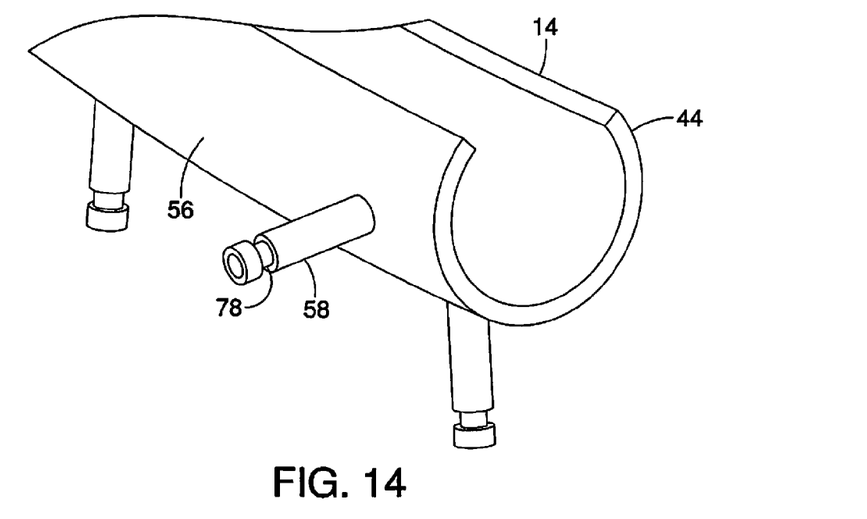
FIG. 14 is an enlarged perspective view of the portion of the duct system configured to couple to the armature.

Further, the peripheral duct section 44 includes a base portion (e.g. a first portion) 56 and a plurality of nozzles (e.g., a second portion) 58. That is, in one embodiment, the first portion of the duct system 14 is the base portion 56 and the second portion of the duct system 14 is the plurality of nozzles 58. As illustrated in FIGS. 13 and 14, the base portion 56 is generally tubular or circular. Thus, the base portion 56 has an arcuate portion that substantially surrounds the peripheral portion 34 of the armature 12, such that the arcuate portion extends more than 180 degrees about an outer rounded contour of the armature 12 (FIG. 13). In this embodiment, the base portion forms a C-shape so as to have a first end 60 and a second end 62, with a space or an opening 64 between the first end 60 and the second end 62. This configuration enables the duct system 14 to snap-fit to the steering wheel armature 12, holding the duct system 14 to the peripheral portion 34 of the armature 12 via a friction or interference fit. Further, the base portion 56 is configured so as to extend along the armature 12 of the steering wheel 10.

The base portion 56 is generally hollow, defining an air passage therethrough. Thus, the base portion 56 is capable of communicating air or fluid from an air passage 66 around the armature 12 of the steering wheel 10 and to the plurality of nozzles 58. As illustrated in FIGS. 7 and 9, the base portion 56 includes an arcuate portion and the plurality of nozzles 58 extend from the arcuate portion, the arcuate portion being configured to enable air to be communicated from the micro fans 48 and 50 to the plurality of nozzles 58. Further, the base portion 56 includes three (3) portions 56*a* having an increased diameter. Each of these portions 56*a* is arranged so as to coincide with the areas 34a in which the arms 36 of the hub portion 17 couple to the ring portion 19 of the armature 12.

The plurality of nozzles 58 includes a first set of nozzles 58a and a second set of nozzles 58b, both of which extend from the exterior surface of the base portion 56. The first set of nozzles 58a extends in a first direction and the second set of nozzles 58b extends in a second direction, the second direction being transverse to the first direction. In this embodiment, the first set of nozzles 58a extends radially outward relative to a rotational axis of the steering wheel 10, and the second set of nozzles 58b extends substantially parallel to the rotational axis of the steering wheel 10. Preferably, the second set of nozzles 58b extends normal to the exterior surface of the base portion 56 and forward toward a vehicle exterior. The first set of nozzles 58a extends normal to the exterior surface of the base portion 56 and radially outwardly approximately 90° offset from the second set of nozzles 58b. However, the nozzles 58 can be disposed in any position or in any manner desired. For example, the nozzles 58 can also extend rearwardly toward the passenger compartment and/or inwardly toward the center of the steering wheel 10.

Each of the nozzles 58 is preferably substantially the same length and configured to extend to the exterior surface 30 of the grip portion 16 when the grip portion 16 is molded onto the armature 12. Each of the nozzles 58 is connected to the base portion 56 at a first proximal end 70 and extends outwardly from the base portion 56 to a second distal end 72. Each of the nozzles 58 is hollow with an opening 74 at the first end 70 and an opening 76 at the second end 72. Thus, the nozzles 58 are configured so as to enable air to pass from the base portion 56 through the nozzles 58 and out of the opening 76 in the second end 72.

Figure 15:
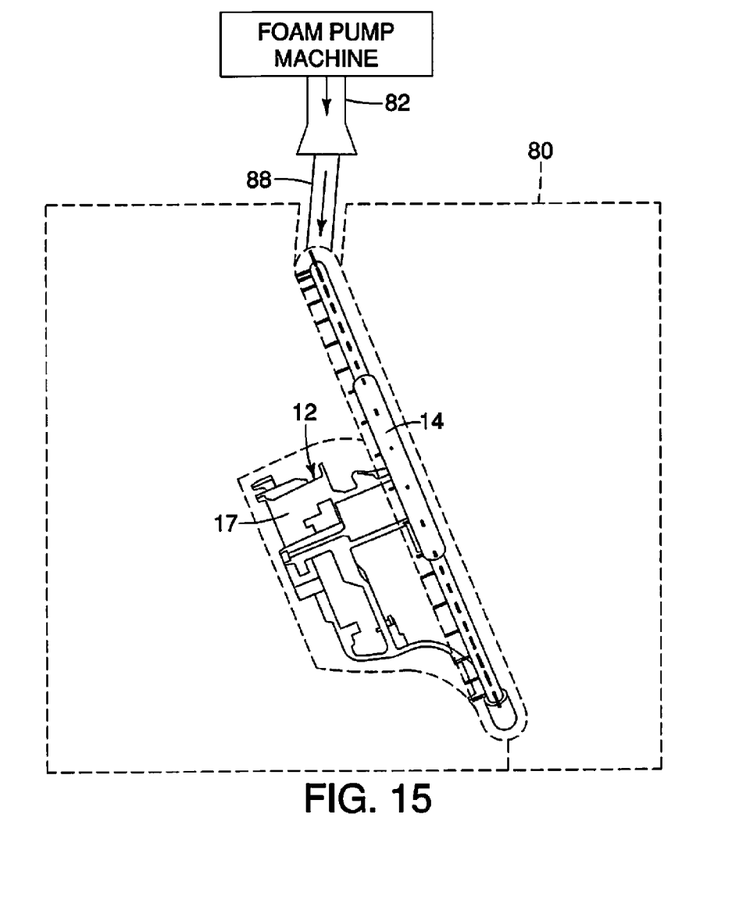
FIG. 15 illustrates the duct system coupled to the armature and disposed in a mold with an injection pump capable of forming the grip portion.

As shown in FIGS. 14 and 15, each of the nozzles 58 can have a frangible portion 78 that is configured to enable the second end 72 of the nozzles 58 to be removed subsequent to the over-molding process. That is, the frangible portion 78 is a thin walled portion adjacent the second end 72 of the nozzle 58. Thus, subsequent to the over-molding process of the grip portion 16 the frangible portion 78 can be severed or broken, causing the second end 72 of the nozzle 58 to be substantially level with the exterior surface 30 of the grip portion 16 or below the level exterior surface 30 of the grip portion 16, thus reducing potential contact between the nozzles 58 and the hands of a driver.

As shown in FIGS. 13 and 15, the duct system 14 is coupled to the armature 12 basically by snapping the duct system 14 over the armature 12. The duct system 14 is thus coupled to the armature 12 via a snap-fitting engagement in this embodiment. Although, as is understood, the duct system 14 can be coupled to the armature 12 in any manner desired. The armature 12 and the duct system 14 are then inserted into a mold 80 to form the grip portion 16. In one embodiment, the grip portion 16 is a polyurethane grip portion 16; however, the grip portion 16 can be formed from any suitable material.

The mold 80 has an interior configuration that enables the grip portion 16 to be formed around the armature 12 and duct system 14 so as to conform to a predetermined shape. The mold 80 is generally an injection mold with a two piece form. The grip portion 16 is injected using an injection pump 82 with an injection nozzle 84. The injection pump 82, injection nozzle 84 and mold 50 are conventional devices and are therefore not discussed in detail. If desired, multiple injection pumps may be used. Walls of the mold 80 can optionally include recesses that receive the second ends 72 of the nozzles 58 such that the second ends 72 of the nozzles 58 are exposed and can be more easily separated from the duct system 14 at the frangible portions 78 after the grip portion 16 is formed.

Figure 16:
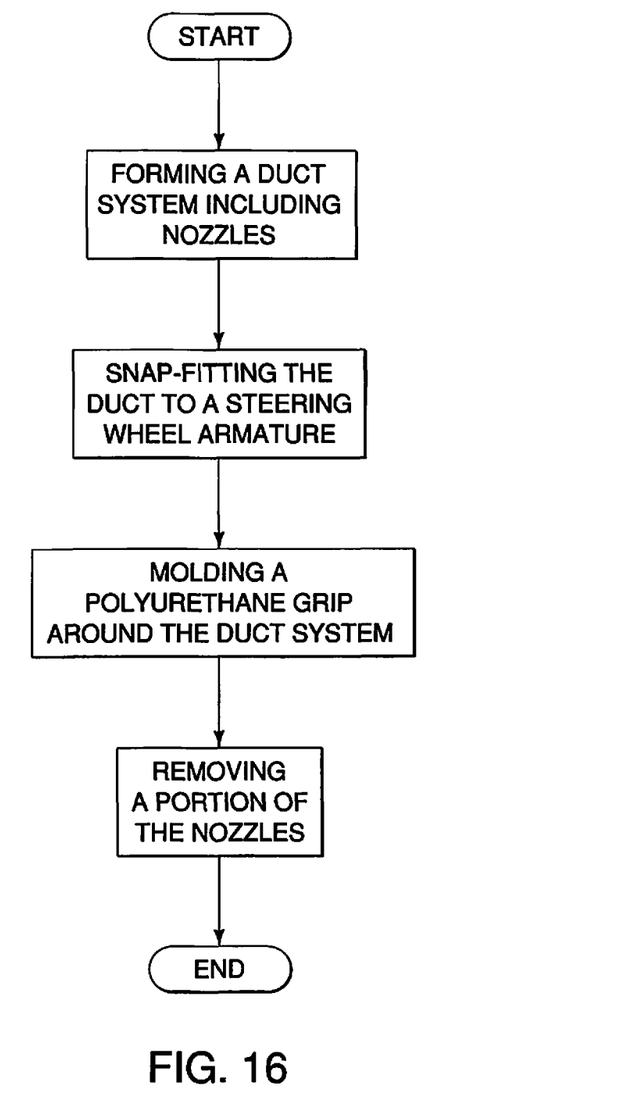
FIG. 16 is a flow chart illustrating the method of making the steering wheel according to one embodiment.

FIG. 16 illustrates one method of forming a cooling system for a steering wheel 10. That is, the first step is forming the duct system 14 including a plurality of nozzles 58. The duct system 14 can be formed from at least one of plastic and stamped steel. The duct system 14 can include a first portion 56 and a second portion 58, the second portion 58 including a plurality of nozzles 58 extending radially from the outer surface of the first portion 56 toward an outer surface of the steering wheel 10. In one embodiment, when forming the duct system 14 a frangible section 58 is formed on each of the plurality of nozzles 58 so as to be disposed below an exterior surface 30 of the grip portion 16 after the over-molding process. The steering wheel armature 12 can be formed as described herein, via a metal or other suitable material molding process. Since such a process is known, it is not discussed in detail herein.

Second, the duct system 14 is coupled to the armature 12 of the steering wheel 10, preferably by snap-fitting the duct system 14 so as to overlie the armature 12. Accordingly, the duct system 14 is configured to be coupled to the exterior surface 12a of the armature 12 prior to a grip portion 16 over-molding process, so as to extend along the armature 12. That is, as is illustrated, after the duct system 14 is coupled to the armature 12, the combination of the duct system 14 and the armature 12 is positioned in a mold 80 and the grip portion 16 is formed by injection molding, so as to over-mold a grip portion 16 around the duct system 14.

The steering wheel 10 is removed, and if necessary, the second ends 72 of the nozzles 58 are removed. That is, if the second ends 72 of the nozzles 58 are in an undesirable position (e.g., extending above the exterior surface 30 of the grip portion 16), the second ends 72 can be removed. The second ends 72 can be removed in any suitable manner, including separation at the frangible portions 78 as described herein. Thus, as illustrated in FIG. 14, the plurality of nozzles 58 is configured to enable openings 76 to be formed in the exterior surface 30 of the grip portion 16, which is formed by an over-molding process. If desired, a leather grip or other exterior covering may be applied to the exterior surface 30 of the grip portion 16, as long as such an exterior covering enables air to pass therethrough and adequately cool the surface of the steering wheel 10 and/or the driver.

This configuration enables the duct system 14 to provide or move air from the micro fans 48 and 50 to the surface 30 of the grip portion 16, providing a cooled surface and/or providing air to the surfaces of a driver's hands or body. Thus, the cooling system for a steering wheel 10 described herein is effective, cost efficient and easy to manufacture.

The steering wheel airbag, steering column connection, and control devices for operating system are conventional components that are well known in the art. Since steering wheel airbags, steering column connections and control devices are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "below" and "transverse" as well as any other similar directional terms refer to those directions of a vehicle equipped with the system for cooling a steering wheel and a method of making. Accordingly, these terms, as utilized to describe the present invention should be interpreted relative to a vehicle equipped with the system for cooling a steering wheel and a method of making.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A system for cooling a steering wheel, the system comprising:
    a fan configured to be attached to the steering wheel; and
    a duct system having a first portion and a second portion, and being configured to be coupled to an exterior surface of an armature of the steering wheel and enable air from the fan to be communicated from the fan to a surface of the steering wheel, the first portion including a section extending along the armature of the steering wheel and the second portion including a plurality of nozzles extending radially from an outer surface of the first portion toward an outer surface of the steering wheel.

2. The system for cooling a steering wheel according to claim 1, wherein
    the duct system is configured to be coupled to the exterior surface of the armature prior to a grip portion molding process.

3. The system for cooling a steering wheel according to claim 1, wherein
    the plurality of nozzles includes a first set of nozzles and a second set of nozzles, the first set of nozzles extending in a first direction and the second set of nozzles extending in a second direction, the second direction being transverse to the first direction.

4. The system for cooling a steering wheel according to claim 3, wherein
    the first set of nozzles extends radially outward relative to a rotational axis of the steering wheel.

5. The system for cooling a steering wheel according to claim 4, wherein
    the second direction is substantially parallel to the rotational axis of the steering wheel.

6. The system for cooling a steering wheel according to claim 1, wherein
    the plurality of nozzles is configured to enable openings to be formed in an exterior surface of a grip portion formed by an over-molding process.

7. The system for cooling a steering wheel according to claim 6, wherein
    each of the nozzles includes a frangible section configured to enable an end of the nozzle to be removed subsequent to the over-molding process.

8. The system for cooling a steering wheel according to claim 7, wherein
    the frangible section is configured to be disposed below an outer surface of the grip portion formed by the over-molding process.

9. The system for cooling a steering wheel according to claim 1, wherein
    the duct system is configured to snap-fit to the steering wheel armature.

10. The system for cooling a steering wheel according to claim 1, wherein
    the duct system is formed from at least one of plastic and stamped steel.

11. The system for cooling a steering wheel according to claim 1, wherein
    the fan is one of a plurality of fans.

12. The system for cooling a steering wheel according to claim 1, wherein
    the duct system includes an arcuate portion and the plurality of nozzles extends from the arcuate portion, the arcuate portion configured to enable air to be communicated from the fan to the plurality of nozzles.

13. The system for cooling a steering wheel according to claim 12, wherein
    the arcuate portion extends more than 180 degrees about an outer rounded contour of the armature.

14. A method of forming a cooling system for a steering wheel, the method comprising:
    forming a duct system including a first portion and a second portion, the second portion including a plurality of nozzles extending radially from an outer surface of the first portion toward an outer surface of the steering wheel;
    attaching the first portion so as to extend along a steering wheel armature; and
    over-molding a grip portion around the duct system.

15. The method of claim 14, wherein
    the attaching the duct system includes snap-fitting the duct-system to the steering wheel armature.

16. The method of claim 14, further comprising
    subsequent to the over-molding, removing a portion of each of the nozzles by severing the nozzle at a frangible section.

17. The method of claim 14, wherein
    the forming a duct system includes molding the duct system from at least one of plastic and stamping steel.

18. The method of claim 14, wherein
    the forming a duct system includes forming a frangible section on each of the plurality of nozzles so as to be disposed below an outer surface of the grip portion after the over-molding.

19. A steering wheel comprising:

an armature;

a fan configured to be attached to the steering wheel;

a duct system having a first portion and a second portion, and being configured to be coupled to an exterior surface of an armature of the steering wheel and enable air from the fan to be communicated from the fan to a surface of the steering wheel, the first portion including a section extending along the armature of the steering wheel and the second portion including a plurality of nozzles extending radially from an outer surface of the first portion toward an outer surface of the steering wheel; and a grip portion disposed around the duct system.

20. The steering wheel according to claim 19, wherein each nozzle of the plurality of nozzles includes a frangible section disposed below an outer surface of the grip section portion.

* * * * *